(12) United States Patent
Healy

(10) Patent No.: US 11,091,133 B2
(45) Date of Patent: Aug. 17, 2021

(54) VEHICLE IMMOBILIZATION MECHANISM

(71) Applicant: HYLIION INC., Cedar Park, TX (US)

(72) Inventor: Thomas Joseph Healy, Austin, TX (US)

(73) Assignee: Hyliion Inc., Cedar Park, TX (US)

( * ) Notice: Subject to any disclaimer, the term of this patent is extended or adjusted under 35 U.S.C. 154(b) by 200 days.

(21) Appl. No.: 16/237,519

(22) Filed: Dec. 31, 2018

(65) Prior Publication Data

US 2019/0202421 A1 Jul. 4, 2019

Related U.S. Application Data

(60) Provisional application No. 62/612,566, filed on Dec. 31, 2017.

(51) Int. Cl.
*B60T 8/17* (2006.01)
*B60T 15/02* (2006.01)
(Continued)

(52) U.S. Cl.
CPC .............. *B60T 8/1708* (2013.01); *B60T 1/10* (2013.01); *B60T 7/16* (2013.01); *B60T 7/20* (2013.01);
(Continued)

(58) Field of Classification Search
CPC ......... B60R 25/33; B60T 8/1708; B60T 7/16; B60T 15/027; B60T 8/17; B60T 1/10; B60T 7/20; B60T 13/662; F16D 61/00
See application file for complete search history.

(56) References Cited

U.S. PATENT DOCUMENTS 4,199,037 A   4/1980   White
5,488,352 A   1/1996   Jasper
(Continued)

FOREIGN PATENT DOCUMENTS

CA           2457216 A1   8/2004
WO    WO 2005012025 A1   2/2005
(Continued)

OTHER PUBLICATIONS

Department of Transportation, "Interstate Truck Driver's Guide to Hours of Service", Published Mar. 2015, United States Federal Government, Pertinent p. 1 (Year: 2015).*
(Continued)

*Primary Examiner* — Peter D Nolan
*Assistant Examiner* — Kenneth M Dunne
(74) *Attorney, Agent, or Firm* — Baker Botts L.L.P.

(57) ABSTRACT

Systems and methods for immobilization of a vehicle include a remote device coupled to a network, the remote device including a transceiver, and a vehicle including a communication interface coupled to the network, the communication interface configured to provide telematics data to, and receive commands from, the transceiver. The system further includes an energy store on the vehicle, the energy store configured to supply electrical power to the communication interface. In some embodiments, at least one of the commands received from the transceiver is configured to immobilize the vehicle. In some cases, the at least one command received from the transceiver is configured to release air pressure in an air line of the vehicle to actuate a plurality of air brakes on the vehicle, or to actuate a wheel-lock mechanism within an electrically powered drive axle on the vehicle.

20 Claims, 8 Drawing Sheets

(51) Int. Cl.

| | |
|---|---|
| *F16D 61/00* | (2006.01) |
| *B60T 7/16* | (2006.01) |
| *B60T 1/10* | (2006.01) |
| *B60T 13/66* | (2006.01) |
| *B60T 7/20* | (2006.01) |
| *B60T 13/68* | (2006.01) |
| *B60T 13/58* | (2006.01) |

(52) U.S. Cl.
CPC .......... *B60T 13/662* (2013.01); *B60T 15/027* (2013.01); *F16D 61/00* (2013.01); *B60T 13/586* (2013.01); *B60T 13/683* (2013.01)

(56) References Cited

U.S. PATENT DOCUMENTS

| | | | |
|---|---|---|---|
| 5,559,420 | A | 9/1996 | Kohchi |
| 6,390,215 | B1 | 5/2002 | Kodama |
| 6,516,925 | B1 | 2/2003 | Napier |
| 7,147,070 | B2 | 12/2006 | Leclerc |
| 7,338,335 | B1 | 3/2008 | Messano |
| 8,327,960 | B2 | 12/2012 | Couture |
| 8,627,908 | B2 | 1/2014 | Wellborn |
| 9,321,357 | B2 | 4/2016 | Caldeira |
| 9,457,666 | B2 | 10/2016 | Caldeira |
| 9,887,570 | B2 | 2/2018 | Johnsen |
| 9,937,819 | B2 | 4/2018 | Healy |
| 9,948,136 | B2 | 4/2018 | Doane |
| 2002/0038730 | A1 | 4/2002 | Bidwell |
| 2002/0056579 | A1 | 5/2002 | Cooper |
| 2004/0002794 | A1 | 1/2004 | Pillar |
| 2005/0045058 | A1 | 3/2005 | Donnelly |
| 2005/0060079 | A1 | 3/2005 | Phillips |
| 2007/0193795 | A1 | 8/2007 | Forsyth |
| 2008/0169144 | A1 | 7/2008 | DeGrave |
| 2008/0174174 | A1 | 7/2008 | Burns |
| 2009/0223725 | A1 | 9/2009 | Rodriguez |
| 2010/0065344 | A1 | 3/2010 | Collings |
| 2010/0141201 | A1 | 6/2010 | Littrell |
| 2010/0224430 | A1 | 9/2010 | Bennett, Sr. |
| 2010/0252339 | A1 | 10/2010 | Bibeau |
| 2010/0282122 | A1 | 11/2010 | Mai |
| 2011/0042154 | A1 | 2/2011 | Bartel |
| 2011/0094807 | A1 | 4/2011 | Pruitt |
| 2011/0320078 | A1 | 12/2011 | McGill |
| 2012/0167555 | A1 | 7/2012 | Frazier |
| 2013/0190998 | A1 | 7/2013 | Polimeno |
| 2013/0204501 | A1 | 8/2013 | Keeney |
| 2013/0338848 | A1 | 12/2013 | Park |
| 2014/0025245 | A1 | 1/2014 | Fanourakis |
| 2014/0116077 | A1 | 5/2014 | Pierce et al. |
| 2015/0204741 | A1 | 7/2015 | Hagan |
| 2015/0298680 | A1 | 10/2015 | Matthews |
| 2015/0298684 | A1 | 10/2015 | Schwartz |
| 2016/0014252 | A1 | 1/2016 | Biderman |
| 2016/0031435 | A1 | 2/2016 | Gibson |
| 2016/0061611 | A1 | 3/2016 | Meyer |
| 2016/0137204 | A1 | 5/2016 | Morselli |
| 2016/0167620 | A1* | 6/2016 | Bryar .................... B60T 13/683 303/71 |
| 2016/0318421 | A1 | 11/2016 | Healy |
| 2017/0011561 | A1* | 1/2017 | Makke .................... G07C 5/085 |
| 2018/0208156 | A1* | 7/2018 | Sandhu et al. .......... B60R 25/33 |
| 2019/0084534 | A1* | 3/2019 | Kasper .................... G08G 1/22 |
| 2020/0031224 | A1* | 1/2020 | Perry .................... B60W 10/16 |
| 2020/0108706 | A1* | 4/2020 | Devreese ................ F16H 37/08 |

FOREIGN PATENT DOCUMENTS

| | | | |
|---|---|---|---|
| WO | WO2009139360 | * 11/2009 | ............. B60R 25/04 |
| WO | WO 2015052567 | 4/2015 | |
| WO | WO 2018064619 A2 | 4/2018 | |

OTHER PUBLICATIONS

Zulkifli, S.A.: "Split-Parallel Through-the-Road Hybrid Electric Vehicle: Operation, Power Flow and Control Modes", 2015 IEEE Transportation Electrification Conference and Expo (ITEC), Jun. 17, 2015 (Jun. 17, 2015), pp. 107.

PCT International Search Report, Application No. PCT/US2017/054587, dated Apr. 20, 2018.

PCT International Search Report, Application No. PCT/US2018/018499, dated May 22, 2018.

European Search Report, Application No. 16789915.2, dated Jan. 8, 2018.

Karbowski, Sokolov, and Rousseau, "Vehicle Energy Management Optimisation through Digital Maps and Connectivity", 22nd ITS World Congress, ITS-1952, Bordeaux, France, Oct. 5-9, 2015.

Lin, Kang, Grizzle, and Peng, "Energy Management Strategy for a Parallel Hybrid Electric Truck", Proceedings of the American Control Conference, 2001, pp. 2878-2883, Digital Object Identifier: 10.1109/ACC.2001.946337.

Zulkifli, Mohd, Saad, and Aziz, "Operation and Control of Split-Parallel, Through-The-Road Hybrid Electric Vehicle With In-Wheel Motors", International Journal of Automotive and Mechanical Engineering, vol. 11, pp. 2793-2808, 2015, Digital Object Identifier: 10.15282/ijame.11.2015.54.0235.

Kural and Guvenc, "Predictive-Equivalent Consumption Minimization Strategy for Energy Management of a Parallel Hybrid Vehicle for Optimal Recuperation", Journal of Polytechnic, 18(3), pp. 113-124, 2015, Digital Object Identifier: 10.2339/2015.18.3, 113-124.

Skugor, Pavkovic, and Deur, "A Series-Parallel Hybrid Electric Vehicle Control Strategy Including Instantaneous Optimization of Equivalent Fuel Consumption", IEEE International Conference on Control Applications, pp. 310-316, 2012.

PCT International Search Report and Written Opinion, Application No. PCT/US2016/030482, dated Aug. 4, 2016.

Musardo, Rizzoni, and Staccia, "A-ECMS: An Adaptive Algorithm for Hybrid Electric Vehicle Energy Management", Proceedings of the 44th IEEE Conference on Decision and Control, 2005, pp. 1816-1823.

Paganelli, Delprat, Guerra, Rimaux, and Santin, "Equivalent Consumption Minimization Strategy for Parallel Hybrid Powertrains", Proceedings of the IEEE 55th Vehicular Technology Conference, 2002, pp. 2076-2081.

Sciarretta, Back, and Guzzella, "Optimal Control of Parallel Hybrid Electric Vehicles", IEEE Transactions on Control Systems Technology, vol. 12, No. 3, pp. 352-363, May 2004.

Sciarretta and Guzzella, "Control of Hybrid Electric Vehicles", IEEE Control Systems Magazine, vol. 27, No. 2, pp. 60-70, Apr. 2007.

* cited by examiner

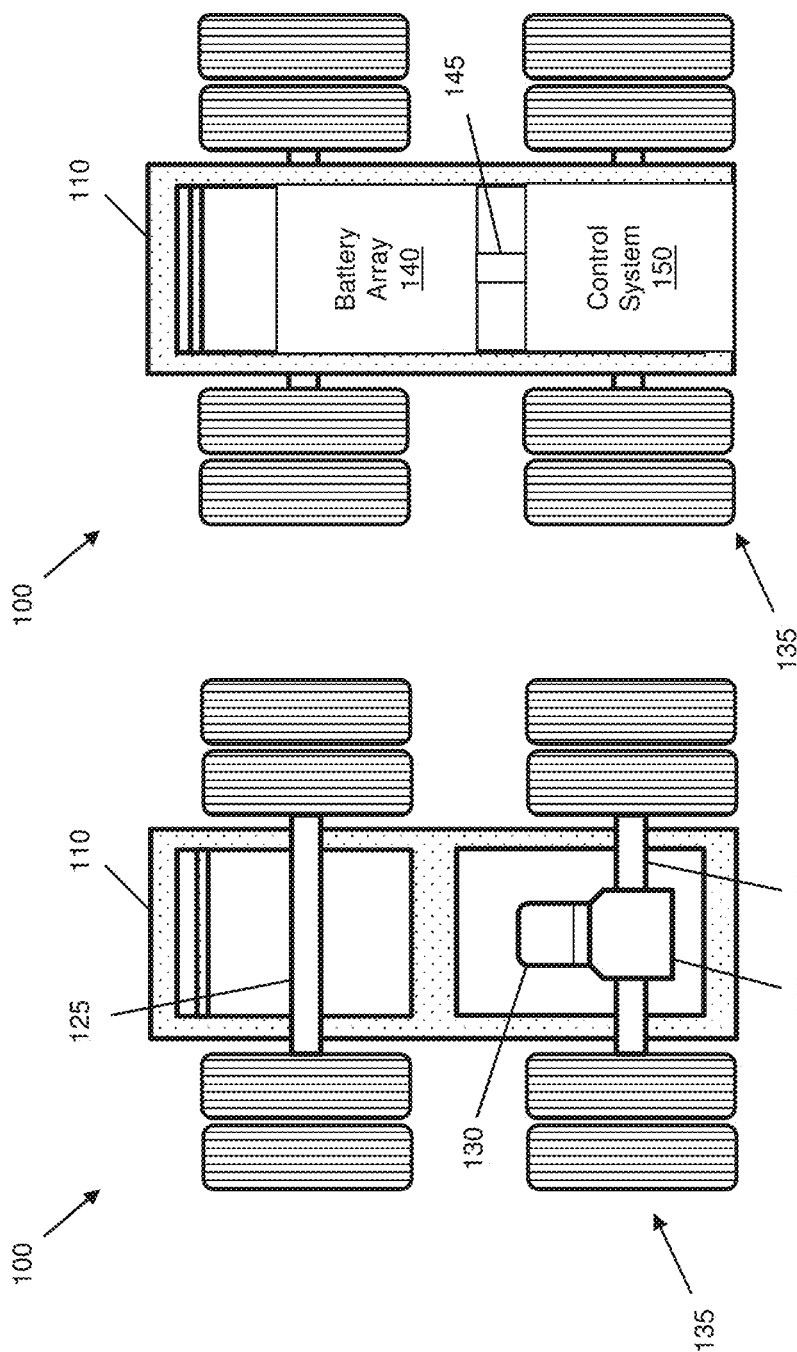

ered, typically without significant redesign of existing
VEHICLE IMMOBILIZATION MECHANISM

RELATED APPLICATIONS

The present application claims priority of U.S. Provisional Application No. 62/612,566, filed Dec. 31, 2017 and is related to U.S. application Ser. No. 15/721,345, filed Sep. 29, 2017, entitled "VEHICLE ENERGY MANAGEMENT SYSTEM AND RELATED METHODS" and naming Thomas Joseph Healy, Wilson Sa and Morgan Culbertson as inventors. Each of the foregoing applications is herein incorporated by reference.

BACKGROUND

Field of the Invention

The invention relates generally to hybrid vehicle technology and braking systems thereof, and in particular to systems and methods to intelligently control regeneration and reuse of captured energy in a through-the-road (TTR) hybrid configuration as well as systems and methods to control hybrid vehicle braking systems.

Description of the Related Art

The U.S. trucking industry consumes about 51 billion gallons of fuel per year, accounting for over 30% of overall industry operating costs. In addition, the trucking industry spends over $100 billion on fuel annually, and the average fuel economy of a tractor-trailer (e.g., an 18-wheeler) is only about 6.5 miles per gallon. For trucking fleets faced with large fuel costs, techniques for reducing those costs would be worth considering.

Hybrid technology has been in development for use in the trucking industry for some time, and some hybrid trucks have entered the market. However, existing systems are generally focused on hybridizing the drivetrain of a heavy truck or tractor unit, while any attached trailer or dead axles remain a passive load. Thus, the extent to which the fuel efficiency of a trucking fleet may be improved using these technologies may be limited to the fuel efficiencies obtained from improvement of the hybrid drivetrain and the in-fleet adoption of such hybrid drivetrain technologies. Given the large numbers of heavy trucks and tractor units already in service and their useful service lifetimes (often 10-20 years), the improved hybrid drivetrains that are candidates for introduction in new vehicles would only address a small fraction of existing fleets.

Separately, heavy trucks or tractor units, as well as any attached trailers, are generally equipped with air brake systems that use compressed air, which is stored in tanks, to produce the force that applies the brakes at each wheel. Air brakes are typically composed of three different braking systems including a service brake system, a parking brake system, and an emergency brake system. In some examples, loss of air pressure in an emergency air line can cause the emergency brakes to engage and stop a vehicle and/or trailer. Such a pressure loss could be caused by a trailer breaking loose (e.g., from a towing vehicle), by a hose, metal tubing, or other part which breaks, causing an air leak. While the emergency brake system provides a way to immobilize a vehicle, the emergency brake system is really only used during an emergency or as a result of a system component failure or leak. However, there may be other circumstances in which it would be desirable to immobilize a heavy truck or tractor unit, as well as any attached trailer.

Thus, increased adoption, improved techniques, and new functional capabilities are all desired.

SUMMARY

It has been discovered that a through-the-road (TTR) hybridization strategy can facilitate introduction of hybrid electric vehicle technology in a significant portion of current and expected trucking fleets. In some cases, the technologies can be retrofitted onto an existing vehicle (e.g., a truck, a tractor unit, a trailer, a tractor-trailer configuration, at a tandem, etc.). In some cases, the technologies can be built into new vehicles. In some cases, one vehicle may be built or retrofitted to operate in tandem with another and provide the hybridization benefits contemplated herein. By supplementing motive forces delivered through a primary drivetrain and fuel-fed engine with supplemental torque delivered at one or more electrically-powered drive axles, improvements in overall fuel efficiency and performance may be delivered, typically without significant redesign of existing components and systems that have been proven in the trucking industry.

In addition, embodiments disclosed herein provide systems and methods for on-demand immobilization of a heavy truck or tractor unit and/or any attached trailer. For example, some embodiments of the present disclosure provide for actuation of a trailer wheel-lock mechanism integrated with a supplemental electric drive (e.g., the electrically-powered drive axle). Some embodiments may employ a controlled lock-off and release of pressure in air brakes of a trailer and/or an engageable locking flange within a differential or other power transfer unit of the supplemental electric drivetrain. In some embodiments, the trailer wheel-lock mechanism or pressure release is remotely actuated via a communication interface and may be employed for anti-theft purposes.

In some embodiments of the present invention, a system for remotely immobilizing a vehicle includes a first brake subsystem configured to actuate a plurality of air brakes coupled to axles of the vehicle when an air pressure in a first air line is below a specified value. A release valve is fluidly connected to the first air line, where the release valve has at least a first operating position and a second operating position. A communication interface is coupled to the release valve, where the communication interface is configured to receive commands from a remote transceiver to position the release valve into one of the first and second operating positions. In some embodiments, while the release valve is positioned in the first operating position, the air pressure in the first line is maintained, and while the release value is positioned in the second operating position, the air pressure in the first air line is released to reduce the air pressure to a value below the specified value and actuate the plurality of air brakes to immobilize the vehicle.

In some embodiments, the vehicle includes a tractor-trailer vehicle, and the first brake subsystem includes one of a tractor brake system and a trailer brake system.

In some embodiments, the vehicle includes a tractor-trailer vehicle, and the communication interface is attached to a tractor unit of the tractor-trailer vehicle or to a trailer of the tractor-trailer vehicle.

In some embodiments, the vehicle further includes an energy store coupled to, and configured to supply electrical power to, the release valve and the communication interface.

In some embodiments, the remote transceiver is implemented as part of a user device or a network-connected service platform.

In some embodiments, the vehicle includes a towed vehicle for use in combination with a towing vehicle, the towed vehicle having an electrically powered drive axle configured to supply supplemental torque to one or more wheels of the towed vehicle and to thereby supplement, while the towed vehicle travels over a roadway and in at least some modes of operation, primary motive forces applied through a separate drivetrain powered by a fuel-fed engine of the towing vehicle.

In some embodiments, the vehicle includes a tractor-trailer vehicle, where the plurality of air brakes includes a first set of air brakes coupled to axles of a tractor unit of the tractor-trailer vehicle and a second set of air brakes coupled to axles of a trailer of the tractor-trailer vehicle. In some cases, while the release valve is positioned in the second operating position, the air pressure in the first air line is released to reduce the air pressure to the value below the specified value and actuate the first set of air brakes, the second set of air brakes, or both the first and second sets of air brakes.

In some embodiments, the vehicle further includes an air compressor, and one or more reservoirs for storing compressed air supplied to the reservoir by the air compressor. In some embodiments, the one or more reservoirs are configured to supply pressurized air to at least the first air line and a second air line.

In some embodiments, the vehicle further includes a second brake subsystem configured to actuate the plurality of air brakes by supplying the pressurized air from the one or more reservoirs to the plurality of air brakes via the second air line when an operator of the vehicle depresses a brake pedal.

In some embodiments, the first brake subsystem includes an emergency brake subsystem, and the second brake subsystem includes a service brake subsystem.

In some embodiments, responsive to telematics data related to the vehicle that is received by the user device or the network-connected service platform, a command to position the release valve in the second operating position is received.

In some embodiments of the present invention, a system for immobilizing a vehicle includes a towed vehicle for use in combination with a towing vehicle, the towed vehicle having an electrically powered drive axle configured to supply supplemental torque to one or more wheels of the towed vehicle and to thereby supplement, while the towed vehicle travels over a roadway and in at least some modes of operation, primary motive forces applied through a separate drivetrain powered by a fuel-fed engine of the towing vehicle. In some embodiments, the vehicle further includes an energy store configured to supply the electrically powered drive axle with electrical power in a first mode of operation and further configured to receive energy recovered using the electrically powered drive axle in a second mode of operation. The vehicle further includes a communication interface coupled to the electrically powered drive axle, where the communication interface is configured to receive commands from a remote transceiver to actuate a wheel-lock mechanism within the electrically powered drive axle. In some cases, actuation of the wheel-lock mechanism includes actuation of a locking flange within a differential of the electrically powered drive axle to immobilize the vehicle.

In some embodiments, the energy store is configured to supply electrical power to the wheel-lock mechanism and the communication interface.

In some embodiments, the locking flange is configured to lock one or more gears of the differential of the electrically powered drive axle.

In some embodiments, the remote transceiver is implemented as part of a user device or a network-connected service platform. In some cases, responsive to telematics data related to the vehicle that is received by the user device or the network-connected service platform, a command to actuate the wheel-lock mechanism within the electrically powered drive axle is received.

In some embodiments, the telematics data includes one or more of vehicle location, vehicle diagnostics, vehicle activity, and driver performance.

In some embodiments of the present invention, a system includes a remote device coupled to a network, the remote device including a transceiver. In some embodiments, the system further includes a vehicle including a communication interface coupled to the network, the communication interface configured to provide telematics data to, and receive commands from, the transceiver. In some examples, the system also includes an energy store on the vehicle, the energy store configured to supply electrical power to the communication interface. In some embodiments, at least one of the commands received from the transceiver is configured to immobilize the vehicle.

In some embodiments, the at least one command received from the transceiver is configured to release air pressure in an air line of the vehicle to actuate a plurality of air brakes on the vehicle.

In some embodiments, the at least one command received from the transceiver is configured to actuate a wheel-lock mechanism within an electrically powered drive axle on the vehicle.

In some embodiments, the telematics data includes one or more of vehicle location, vehicle diagnostics, vehicle activity, and driver performance.

BRIEF DESCRIPTION OF THE DRAWINGS

The present invention is illustrated by way of example and not limitation with reference to the accompanying figures, in which like references generally indicate similar elements or features.

FIG. 1A depicts a bottom view of a hybrid suspension system, in accordance with some embodiments;

FIG. 1B depicts a top view of the hybrid suspension system, in accordance with some embodiments;

Figure 1C:
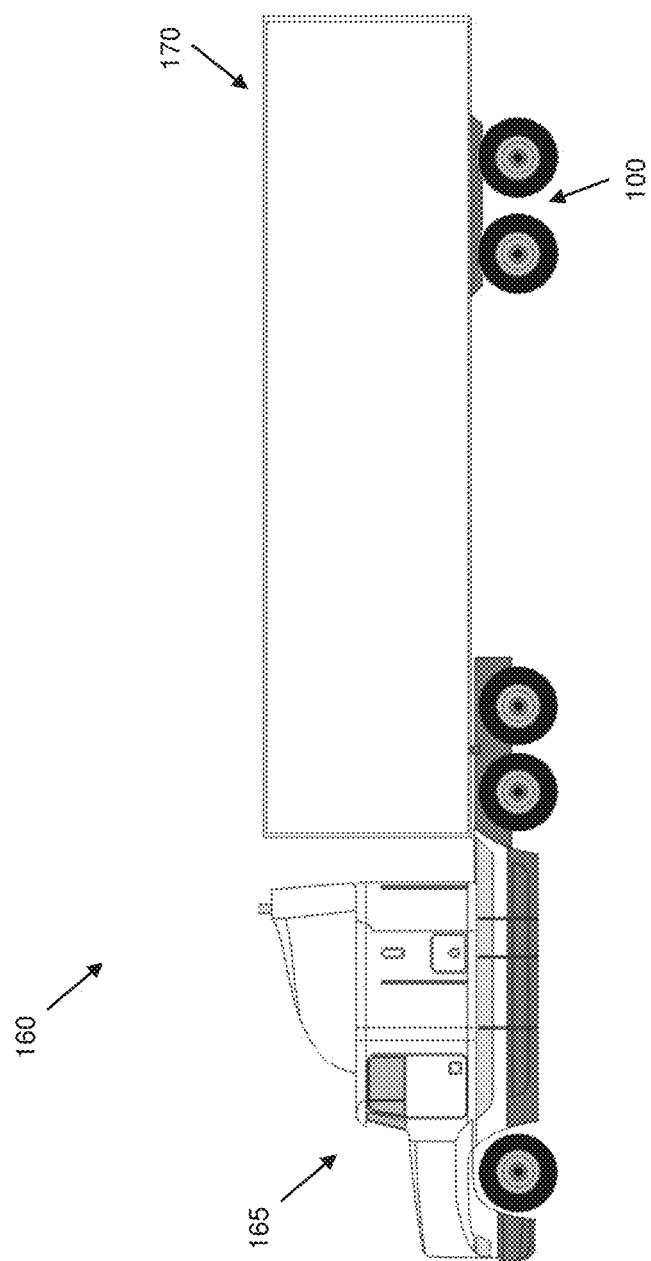
FIG. 1C depicts an exemplary tractor-trailer vehicle, including the hybrid suspension system, in accordance with some embodiments.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of certain embodiments of the present invention(s).

DESCRIPTION

The present application describes a variety of embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In particular, the present disclosure describes designs and techniques for providing an energy management system and related methods in the context of systems and components typical in the heavy trucking industry. Some embodiments of the present invention(s) provide a hybridized suspension assembly (e.g., an electrically driven axle, power source, controller, etc. that may be integrated with suspension components) affixed (or suitable for affixing) underneath a vehicle (e.g., a truck, tractor unit, trailer, tractor-trailer or tandem configuration, etc.) as a replacement to a passive suspension assembly. In various non-limiting example configurations, a hybridized suspension assembly can be part of a trailer that may be towed by a powered vehicle, such as a fuel-consuming tractor unit.

As described in more detail below, a hybridized suspension assembly is but one realization in which an electrically driven axle operates largely independently of the fuel-fed engine and primary drivetrain of a powered vehicle and is configured to operate in power assist, regeneration, and passive modes to supplement motive/braking forces and torques applied by the primary drivetrain and/or in braking. In general, one or more electrically driven axles may supplement motive/braking forces and torques under control of a controller (or controllers) that does not itself (or do not themselves) control the fuel-fed engine and primary drivetrain. Instead, a control strategy implemented by an electric drive controller seeks to follow and supplement the motive inputs of the fuel-fed engine and primary drivetrain using operating parameters that are observable (e.g., via CANbus or SAE J1939 type interfaces), kinematics that are sensed and/or states that may be computationally estimated based on either or both of the foregoing. In some embodiments, based on such observed, sensed or estimated parameters or states, the electric drive controller applies an equivalent consumption minimization strategy (ECMS) or adaptive ECMS type control strategy to modulate the motive force or torque provided, at the electrically driven axle(s), as a supplement to that independently applied using the fuel-fed engine and primary drivetrain of the powered vehicle.

By supplementing the fuel-fed engine and primary drivetrain of the powered vehicle, some embodiments of the present invention(s) seek to simultaneously optimize fuel consumption of the powered vehicle, energy consumption of the hybrid suspension assembly, and/or state of charge (SOC) of on-board batteries or other energy stores. In some cases, such as during stopovers, embodiments of the present disclosure allow the fuel-fed engine to shut down rather than idle. In some cases, energy consumption management strategies may take into account a desired SOC at scheduled, mandated or predicted stopovers. Among other advantages, embodiments disclosed herein provide for a significant reduction in fuel consumption (e.g., an average of about 30%), a built-in auxiliary power unit (APU), enhanced stability control, improved trailer dynamics, and a host of other benefits, at least some of which are described in more detail below.

Reference is now made to FIGS. 1A-1C, where FIGS. 1A and 1B illustrate a hybrid suspension system 100, and FIG. 1C illustrates a tractor-trailer vehicle including the hybrid suspension system 100. As used herein, the term hybrid suspension system is meant to convey to a person of skill in the art having benefit of the present disclosure, a range of embodiments in which some or all components of a supplemental electrically driven axle, often (though not necessarily) including a controller, a power source, brake line sensors, CANbus or SAE J1939 type interfaces, sensor packages, off-vehicle radio frequency (RF) communications and/or geopositioning interfaces, etc. are packaged or integratable with components that mechanically interface one or more axles and wheels to the frame or structure of a vehicle and which typically operate (or interface with additional components) to absorb or dampen mechanical perturbations and maintain tire contact with a roadway during travel thereover. In some though not all embodiments, a hybrid suspension system can take on the form or character of an assembly commonly referred to in the U.S. trucking industry as a slider box. In some though not all embodiments, a hybrid suspension system may be or become more integral with a vehicle frame and need not have the modular or fore/aft adjustability commonly associated with slider boxes.

Likewise, the "hybrid" or hybridizing character of a hybrid suspension system, such as hybrid suspension system 100, will be understood by persons of skill in the art having benefit of the present disclosure in the context of its role in hybridizing the sources of motive force or torque available in an over-the-road vehicle configuration that includes it. Accordingly, a hybrid suspension system including an electrically-driven axle and controller for coordinating its supplementation of motive force or torques need not, and typically does not itself include, the additional drive axles driven by the fuel fed engine to which it contributes a hybrid or hybridizing source of motive force or torque. Thus, the tractor-trailer configuration (160) illustrated in FIG. 1C is exemplary and will be understood to include a hybrid suspension system, notwithstanding the ability of the trailer (170) to be decoupled from tractor units (e.g., tractor unit 165) that provide the fuel fed engine and primary drivetrain to which it acts as a supplement. Correspondingly, a vehicle such as a heavy truck having a single frame or operable as or with tandem trailers (not specifically shown in FIG. 1C) will be understood to be amenable to inclusion of one or more hybrid suspension systems.

In view of the foregoing, and without limitation, hybrid suspension system-type embodiments are now described with respect to specific examples.

Hybrid Suspension System

As described in more detail below, the hybrid suspension system 100 may include a frame 110, a suspension, one or more drive axles (e.g., such as a drive axle 120), at least one electric motor-generator (e.g., such as an electric-motor generator 130) coupled to the at least one or more drive axles, an energy storage system (e.g., such as a battery array 140), and a controller (e.g., such as a control system 150). In accordance with at least some embodiments, the hybrid suspension system 100 is configured for attachment beneath a trailer. As used herein, the term "trailer" is used to refer to an unpowered vehicle towed by a powered vehicle. In some cases, the trailer may include a semi-trailer coupled to and towed by a truck or tractor (e.g., a powered towing vehicle). By way of example, FIG. 1C illustrates a tractor-trailer vehicle 160 that includes a tractor 165 coupled to and operable to tow a trailer 170. In particular, and in accordance with embodiments of the present disclosure, the hybrid suspension system 100 is coupled underneath the trailer 170, as a replacement to a passive suspension assembly, as discussed in more detail below. For purposes of this discussion, the tractor 165 may be referred to generally as a "powered towing vehicle" or simply as a "powered vehicle".

To be sure, embodiments of the present disclosure may equally be applied to other types of trailers (e.g., utility trailer, boat trailer, travel trailer, livestock trailer, bicycle trailer, motorcycle trailer, a gooseneck trailer, flat trailer, tank trailer, farm trailer, or other type of unpowered trailer) towed by other types of powered towing vehicles (e.g., pickup trucks, automobiles, motorcycles, bicycles, buses, or other type of powered vehicle), without departing from the scope of this disclosure. Likewise, although components are introduced and described in the context of an exemplary suspension assembly for a trailer, persons of skill in the art having benefit of the present disclosure will appreciate adaptations of configurations and components introduced in the exemplary trailer context to supplemental electrically driven axle applications such as affixed (or suitable for affixing) underneath a vehicle (e.g., a truck, tractor unit, trailer, tractor-trailer or tandem configuration, etc.).

Vehicles may utilize a variety of technologies and fuel types such as diesel, gasoline, propane, biodiesel, ethanol (E85), compressed natural gas (CNG), hydrogen internal combustion engine (ICE), homogeneous charge compression ignition (HCCI) engine, hydrogen fuel cell, hybrid electric, plug-in hybrid, battery electric, and/or other type of fuel/technology. Regardless of the type of technology and/or fuel type, the powered towing vehicle (or more generally the fuel-fed engine of a powered vehicle) may have a particular fuel efficiency. As described below, and among other advantages, embodiments of the present disclosure provide for improved fuel efficiency of the powered vehicle, as described in more detail herein. More generally, and in accordance with various embodiments, the hybrid suspension system 100 described herein is configured (or may be adapted) for use with any type of trailer or powered vehicle.

In some embodiments, the hybrid suspension system 100 includes one or more on-board sensors. As used herein, the term "on-board sensors" may be used to describe sensors that are coupled to or part of the hybrid suspension system 100, sensors that are coupled to or part of a trailer to which the hybrid suspension system 100 is attached, as well as remote sensors that may communicate (e.g., by way of cellular, wireless, RF, satellite, or other such communication) data to a receiver or transceiver that is coupled to or part of the hybrid suspension system 100 or the trailer. In some embodiments, the described sensors may be coupled to or part of a tractor (e.g., the tractor 165) to which the trailer is coupled. In various embodiments, the sensors may include one or more of a brake pressure sensor, an altitude and heading reference system, one or more smart sensors which may include a global positioning system as well as other smart sensors and/or telematics systems, a trailer weight sensor which may include an air bag pressure sensor (e.g., provided in a suspension assembly of the towed vehicle) or other type of weight sensor, a speed sensor, a gyroscope, an accelerometer, a magnetometer, a lateral acceleration sensor, a torque sensor, an inclinometer, and/or other suitable sensor.

In addition, the hybrid suspension system 100 is configured to operate largely independently of the fuel-fed engine and primary drivetrain of a powered vehicle and, in some cases, autonomously from the engine and drivetrain controls of the powered vehicle. As used herein, "autonomous" operation of the hybrid suspension system 100 is terminology used to describe an ability of the hybrid suspension system 100 to operate without commands or signals from the powered towing vehicle, to independently gain information about itself and the environment, and to make decisions and/or perform various functions based on one or more algorithms stored in the controller. "Autonomous" operation does not preclude observation or estimation of certain parameters or states of a powered vehicle's fuel-fed engine or primary drivetrain; however, in some embodiments of the present invention(s), electrically driven axles are not directly controlled by an engine control module (ECM) of the powered vehicle and, even where ECMS or adaptive ECMS-type control strategies are employed, no single controller manages control inputs to both the supplemental electrically driven axle(s) and the primary fuel-fed engine and drivetrain.

A trailer, as typically an unpowered vehicle, includes one or more passive axles. By way of example, embodiments of the present disclosure provide for replacement of the one or more passive trailer axles with one or more powered axles. For example, in at least some embodiments, the hybrid suspension system 100 may replace a passive tandem axle with a powered tandem axle, as shown in the example of FIG. 1C. In accordance with some embodiments the present invention(s), the hybrid suspension system 100 can be configured to provide, in a first mode of operation, a motive rotational force (e.g., by an electric motor-generator coupled to a drive axle) to propel the hybrid suspension system 100, and thus the trailer under which is attached, thereby providing an assistive motive force to the powered towing vehicle. Thus, in some examples, the first mode of operation may be referred to as a "power assist mode." Additionally, in some embodiments, the hybrid suspension system 100 is configured to provide, in a second mode of operation, a regenerative braking force (e.g., by the electric motor-generator coupled to the drive axle) that charges an energy storage system (e.g., the battery array). Thus, in some examples, the second mode of operation may be referred to as a "regeneration mode." In some examples, the hybrid suspension system 100 is further configured to provide, in a third mode of operation, neither motive rotational nor regenerative braking force such that the trailer and the attached hybrid suspension system 100 are solely propelled by the powered towing vehicle to which the trailer is coupled. Thus, in some examples, the third mode of operation may be referred to as a "passive mode."

In providing powered axle(s) to the trailer (e.g., by the hybrid suspension system 100), embodiments of the present disclosure result in a significant reduction in both fuel consumption and any associated vehicle emissions, and thus a concurrent improvement in fuel efficiency, of the powered towing vehicle. In addition, various embodiments may provide for improved vehicle acceleration, vehicle stability, and energy recapture (e.g., via regenerative braking) that may be used for a variety of different purposes. For example, embodiments disclosed herein may use the recaptured energy to apply the motive rotational force using the electric motor-generator and/or to provide an auxiliary power unit (APU) that may be used for powering a lift gate, a refrigeration unit, a heating ventilation and air conditioning (HVAC) system, pumps, lighting, communications systems, or other accessory devices (e.g., during a stopover). It is noted that the above advantages and applications are merely exemplary, and additional advantages and applications will become apparent to those skilled in the art upon review of this disclosure.

Referring again to FIG. 1A, illustrated therein is a bottom view of an exemplary hybrid suspension system 100 which shows the frame 110, the drive axle 120, a passive axle 125, and wheels/tires 135 coupled to ends of each of the drive axle 120 and the passive axle 125. In some embodiments, the electric motor-generator 130 is coupled to the drive axle 120 by way of a differential 115, thereby allowing the electric motor generator 130 to provide the motive rotational force in the first mode of operation, and to charge the energy storage system (e.g., the battery array) by regenerative braking in the second mode of operation. Note that in some embodiments, components such as the electric motor generator, gearing and any differential may be more or less integrally defined, e.g., within a single assembly or as a collection of mechanically coupled components, to provide an electrically-driven axle. While shown as having one drive axle and one passive axle, in some embodiments, the hybrid suspension system 100 may have any number of axles, two or more drive axles, as well as multiple electric-motor generators on each drive axle. In addition, axles of the hybrid suspension system (e.g., the drive axle 120 and the passive axle 125) may be coupled to the frame 110 by a leaf spring suspension, an air suspension, a fixed suspension, a sliding suspension, or other appropriate suspension. In some embodiments, the wheels/tires 135 coupled to ends of one or both of the drive axle 120 and the passive axle 125 may be further coupled to a steering system (e.g., such as a manual or power steering system), thereby providing for steering of the hybrid suspension system 100 in a desired direction.

With reference to FIG. 1B, illustrated therein is a top view of the hybrid suspension system 100 showing the battery array 140 and the control system 150. In various embodiments, the battery array 140 and the control system 150 may be coupled to each other by an electrical coupling 145. In addition, the electric motor-generator 130 may be coupled to the control system 150 and to the battery array 140, thereby providing for energy transfer between the battery array 140 and the electric motor-generator 130. In various examples, the battery array 140 may include one or more of an energy dense battery and a power dense battery. For example, in some embodiments, the battery array 140 may include one or more of a nickel metal hydride (NiMH) battery, a lithium ion (Li-ion) battery, a lithium titanium oxide (LTO) battery, a nickel manganese cobalt (NMC) battery, a supercapacitor, a lead-acid battery, or other type of energy dense and/or power dense battery.

For purposes of this discussion, the hybrid suspension system 100, the coupled trailer, and the powered vehicle may be collectively referred to as "a hybrid trailer vehicle system (HTVS)". Thus, in some embodiments, the tractor-trailer vehicle 160 of FIG. 1C may be referred to as an HVTS.

Exemplary Network Design

Figure 1D:
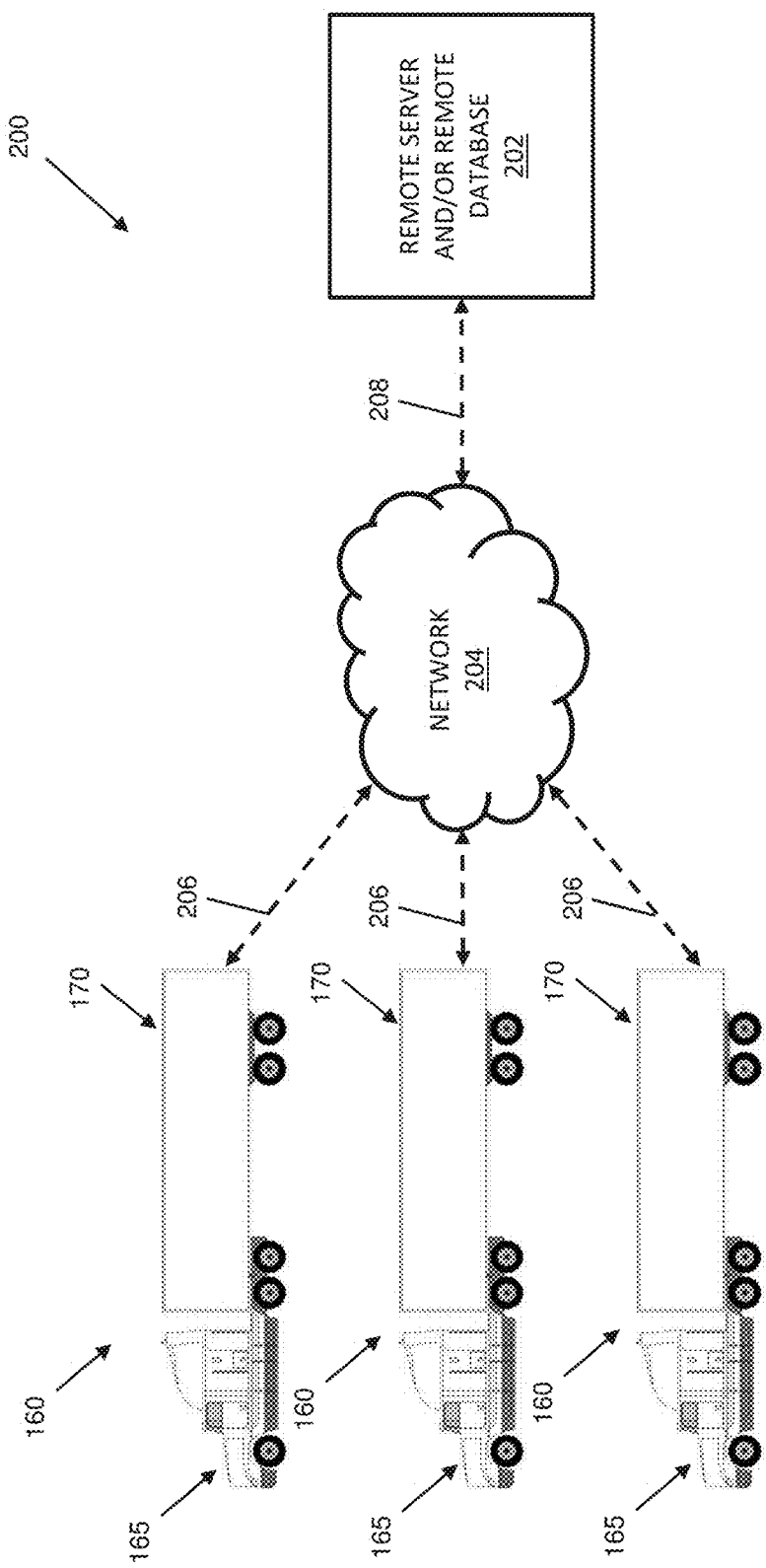
FIG. 1D depicts an exemplary system for providing communication between a tractor-trailer vehicle and a network-connected service platform, in accordance with some embodiments.
Figure 1E:
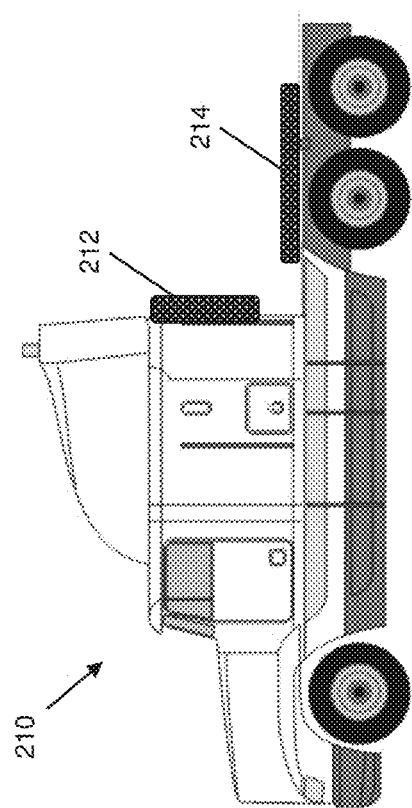
FIG. 1E depicts an exemplary tractor unit including an autonomous hybrid electric drive (AHED) unit, in accordance with some embodiments.
Figure 1F:
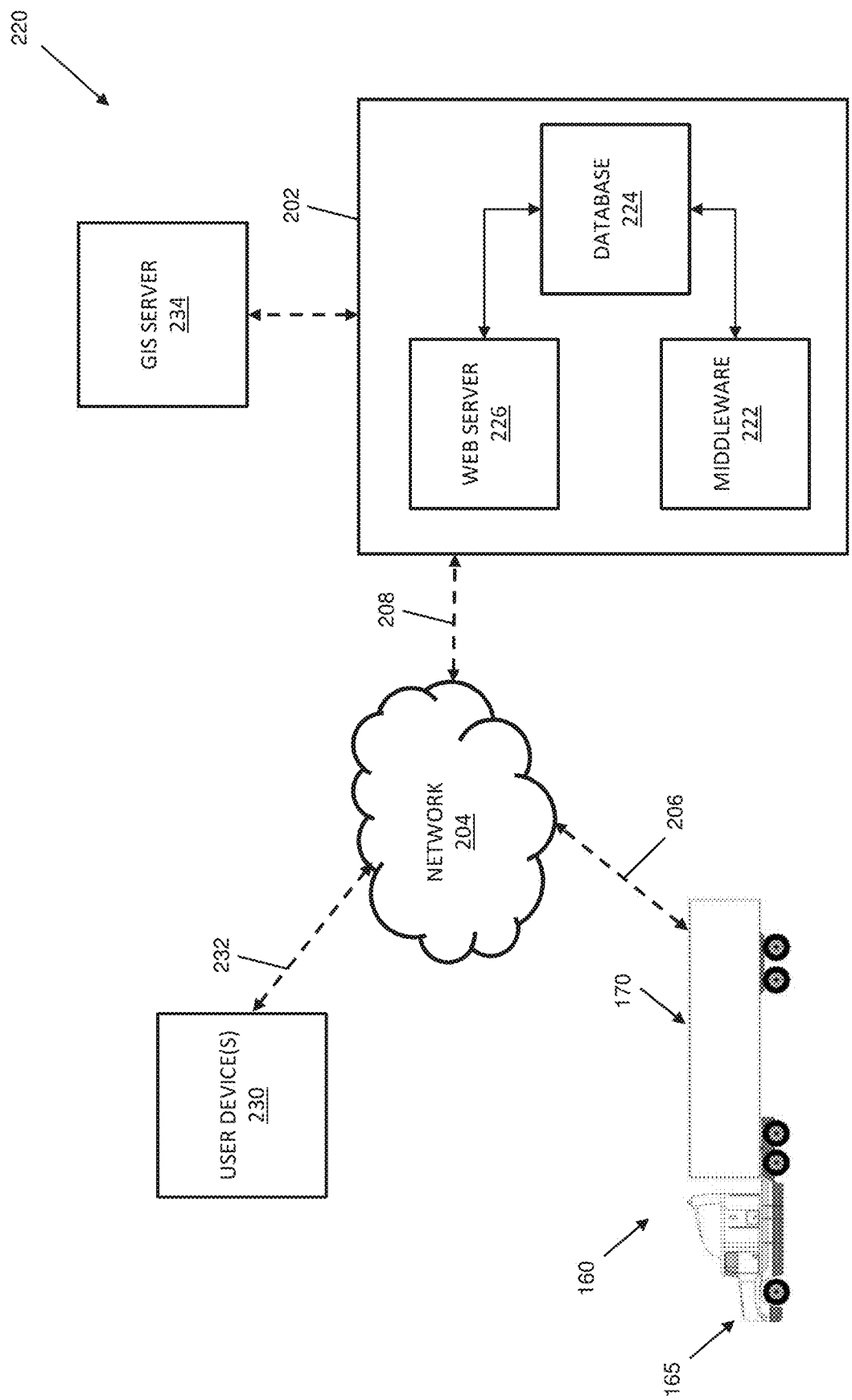
FIG. 1F depicts another exemplary system for providing communication between a tractor-trailer vehicle and a network-connected service platform, in accordance with some embodiments.

With reference to FIGS. 1D-1F, the previously described hybrid suspension system 100, and more generally any of a plurality of tractor-trailer vehicles 160, may be configured to communicate with a network-connected server, database, or other network-connected service platform to provide the various functionality disclosed herein, or other features and/or functionality. For example, and with reference to FIG. 1D, an exemplary system 200 for providing communication between a tractor-trailer vehicle and a network-connected service platform is shown. In some embodiments, one or more tractor-trailer vehicles 160 are configured to communicate with a remote server 202 by way of a network 204, using one or more network communication devices.

The network 204 may be implemented as a single network or a combination of multiple networks. For example, in various embodiments, the network 204 may include the Internet and/or one or more intranets, landline networks, wireless networks, cellular networks, satellite networks, point-to-point communication links, and/or other appropriate types of networks. In some examples, the one or more tractor-trailer vehicles 160 and the remote server 202 may communicate through the network 204 via cellular communication, by way of one or more user-side network communication devices or server-side network communication devices. Thus, as merely one example, connections 206 between the one or more tractor-trailer vehicles 160 and the network 204 may include a 3G cellular connection, a universal mobile telecommunications system (UMTS) connection, a high-speed packet access (HSPA) connection, a 4G/LTE connection, a combination thereof, or other appropriate connection now existing or hereafter developed. Further, in an example, a connection 208 between the network 204 and the remote server 202 may include an Internet trunk connection. The Internet truck connection may be used to simultaneously provide network access to a plurality of clients, for example, such as the one or more tractor-trailer vehicles 160.

In other examples, the one or more tractor-trailer vehicles 160 and the remote server 202 may communicate through the network 204 via wireless communication (e.g., via a WiFi network), by way of one or more user-side network communication devices or server-side network communication devices. In yet other examples, the one or more tractor-trailer vehicles 160 and the remote server 202 may communicate through the network 204 via any of a plurality of other radio and/or telecommunications protocols, by way of one or more user-side network communication devices or server-side network communication devices. While some examples of communication between the one or more tractor-trailer vehicles 160 and the remote server 202 have been provided, those skilled in the art in possession of the present disclosure will recognize other network configurations, components, and/or protocols that may be used, while remaining within the scope of the present disclosure.

Referring now to FIG. 1E, an exemplary tractor unit 210 suitable for implementation within the system 200 is provided. In some embodiments, the tractor unit 210 may be substantially similar to the tractor unit 165 described above. As shown, the tractor unit 210 may include an autonomous hybrid electric drive (AHED) unit including a management and control mobile controller (MCOMCTLR) 212 and a hybrid auxiliary device controller (HADCTLR) 214. In some cases, one or more features of, or functions provided by, the AHED unit may be included within or provided by the control system 150, described above. Stated another way, and in some embodiments, the control system 150 may be used to implement the various functions of the AHED unit described herein. In some embodiments, the AHED unit may provide various operating modes such as a hybrid (autonomous) operating mode, an APU Prep mode, an APU mode (e.g., where the AHED unit operates as an APU), a manual control mode (including sub-modes such as neutral, drive, regen, sleep, update), and an anti-theft mode (e.g., that may disable one or more functions of the tractor-trailer vehicle 160). Generally, in various cases, the AHED unit may be configured for communication with the remote server 202 by way of the network 204. In some examples, the AHED unit may be used to transmit component/asset and telematics data to the remote server 202. While shown as attached to portions of the tractor unit 210, in some cases, the AHED unit or components thereof (e.g., one or both of the MCOMCTLR 212 and the HADCTLR 214) may alternatively be attached to portions of a trailer (e.g., the trailer 170) towed by the tractor unit.

The MCOMCTLR 212 more specifically may function as a management, algorithmic, and communications module for the AHED unit. For example, the MCOMCTLR 212 may be used to connect to the remote server 202 via the network 204, and to the HADCTLR 214 via a CAN V2.0 connection. In various embodiments, the MCOMCTLR 212 has cellular, GPS, data protocol, algorithmic, statistical and system management responsibilities. For instance, the MCOMCTLR 212 manages messaging, events, and reporting to the remote server 202, performs an Autonomous/Hybrid Control algorithm, provides error detection and recovery, monitors the HADCTLR 214, gathers and reports GPS information (e.g., to the remote server 202), manages over the air updates, and provides a single management interface to the remove server 202.

The HADCTLR 214, in some cases, includes an embedded controller disposed within a grounded, low-voltage (GLV) enclosure. The HADCTLR 214 may be used to control system relays, component initialization sequences, and SAE J1939 message capture and forwarding. A select set of SAE J1939 messages may be forwarded to the MCOMCTLR 212 for algorithmic and statistical processing via the internal CAN bus. By way of example, the HADCTLR 214 manages device activation via relays driven by CAN messages (e.g., devices such as an AC Motor controller, a battery management system, a DC/DC Inverter, an altitude and heading reference system (AHRS), temperature sensors, or other such devices), maintains and sends state information to the MCOMCTLR 212, and captures J1939 bus CAN messages (e.g., from the tractor unit 210) and forwards the select set of J1939 messages to the MCOMCTLR 212, as noted.

With reference to FIG. 1F, illustrated therein is an exemplary system 220 for providing communication between a tractor-trailer vehicle and a network server or remote server/database. Various aspects of the system 220 are substantially the same as the system 200, discussed above. Thus, for clarity of discussion, some features may only be briefly discussed. FIG. 1F, in particular, provides a more detailed view of the remote server 202. As shown, the remove server 202 may include a middleware component 222, a database 224, and a web server 226. In various examples, each of the middleware 222, the database 224, and the web server 226 may be implemented using separate machines (e.g., computers/servers), or may be collocated on a single machine. The middleware 222 may be configured to receive and process data (e.g., from the AHED unit) and store the data in the database 224. The database 224 may be used to store any such data received from AHED units of any of a number of tractor-trailer vehicles 160, as well as to store customer/user account information, and store asset tracking information (e.g., for tracking the tractor-trailer vehicles 160). In some examples, the database 224 is implemented using a PostgreSQL object-relational database management system, enabling multi-node clustering. The web server 226 can be used to store, process, and deliver web pages (e.g., that provide a user-interface) to any of a plurality of users operating user devices 230. In some embodiments, the user devices 230 may include any type of computing device such as a laptop, a desktop, a mobile device, or other appropriate computing device operated by any type of user (e.g., individual, driver, fleet manager, or other type of user). In some examples, connections 232 between the user devices 230 and the network 204 may include a 3G cellular connection, a universal mobile telecommunications system (UMTS) connection, a high-speed packet access (HSPA) connection, a 4G/LTE connection, an RF connection, a Wi-Fi connection, a Bluetooth connection, another wireless communication interface, combinations thereof, or other appropriate connection now existing or hereafter developed. In some embodiments, the remote server 202 may further couple to a geographic information system (GIS) server 234, which provides maps for the GPS locations associated with data received from the AHED unit. In one example, a single instance of the middleware 222, the database 224, the web server 226, and the GIS server 234 may support up to 10,000 AHED units, and thus up to 10,000 tractor-trailer vehicles 160. Thus, instances of one or more of these components may be scaled up as needed in order to meet various performance and/or economic goals.

In addition to the various features described above, the systems 200, 220 may be configured to provide real-time location and mapping of tractor-trailer vehicles 160 (including a tractor unit or trailer), an ability to assign tags to any particular tractor unit or trailer (e.g., to provide a trailer type, trailer number, group/region/fleet information, owner information, or contact information), an ability to provide on-demand and/or schedulable reports, among other features. By way of example, such reports may include a percentage time a trailer is loaded vs. empty, moving vs. stationary, and/or attached vs. standalone. Exemplary reports may further provide an approximate trailer weight, fuel savings information, shock/vibration information, braking information, adverse swaying (e.g., jack-knifing) information, lost traction/wheel-slip information, battery levels, and/or APU usage information. The systems 200, 220 also provide for the configuration of alerts (e.g., to alert a driver, fleet manager, or other user) for a variety of conditions such as aggressive braking, excessive shock, excessive idling, APU power low, overheating, unit damage, and/or battery or device failure. In some embodiments, the systems 200, 220 may further include an ability to set and/or otherwise define 'Operation Hours' for a given trailer and/or tractor unit, and alerts may be set for operation activity occurring outside the defined 'Operation Hours'. In some cases, the systems 200, 220 may also monitor driver behaviors (e.g., driving patterns), real-time traffic data, weather information, road conditions, and/or other such factors that may be used to determine a desired stopover location, an optimal navigation route to the stopover location, and/or an estimated time of arrival (ETA) at the stopover location. For example, in some embodiments, one or more of the above features may be implemented in part using a vehicle navigation system (e.g., such as a GPS navigation system) on the tractor-trailer vehicles 160, where the navigation system incorporates the traffic data, weather information, road conditions, etc. to determine the route and ETA to the stopover location. While some examples of various features provided by the systems 200, 220 have been provided, those skilled in the art in possession of the present disclosure will recognize other features that may be implemented, while remaining within the scope of the present disclosure.

Braking System and Methods, Generally

With reference to the hybrid suspension system 100 discussed above, and more generally with reference to the systems 200, 220, the systems may be used to monitor one or more pneumatic brake lines, such that embodiments of the present disclosure provide a 'fail safe' mode where the hybrid suspension system 100 will not accelerate (e.g., operate in a power assist mode) while a driver (e.g. of the powered vehicle) is actuating a brake system. In various embodiments, by monitoring feedback pressure of each wheel's brake lines, as well as their respective wheel speeds, the present system can determine how each brake for a particular wheel is performing. Thus, in various examples, embodiments of the present disclosure may provide for braking and/or powering of different wheels independently from one another for increased trailer stability. In some cases, this may be referred to as "torque vectoring". By way of example, such torque vectoring embodiments may be particularly useful when there are differences in roadway surfaces upon which each of a plurality of wheels of the HTVS is traveling (e.g., when roadway conditions are inconsistent, slippery, rough, etc.).

In addition, and in various embodiments, the present system may be deployed with two pneumatic brake lines (e.g., which may include existing brake lines such as a service air line and an emergency air line), while an entirety of the controls (e.g., including sensor input processing, mode of operation control, aspects of the various methods described above, and other decision-making controls) may reside entirely within the hybrid suspension system 100 itself (e.g., and in many respects, within the control system 150). To be sure, in some examples, the controls may equally or alternatively reside in other components of the systems 200, 220, such as within the AHED units, the user devices 230, the remote server 202, the GIS server 234, or a combination thereof.

Generally, heavy trucks or tractor units, as well as any attached trailers, are equipped with air brake systems that use compressed air, which is stored in tanks, to produce the force that applies the brakes at each wheel. Air brakes are typically composed of three different braking systems including a service brake system, a parking brake system, and an emergency brake system. By way of example, the service brake system applies and releases the brakes when a brake pedal is depressed during normal driving, the parking brake system applies and releases the parking brakes when the parking brake control is actuated, and the emergency brake system uses parts of the service and parking brake systems to stop the vehicle in a brake system failure.

Figure 2:
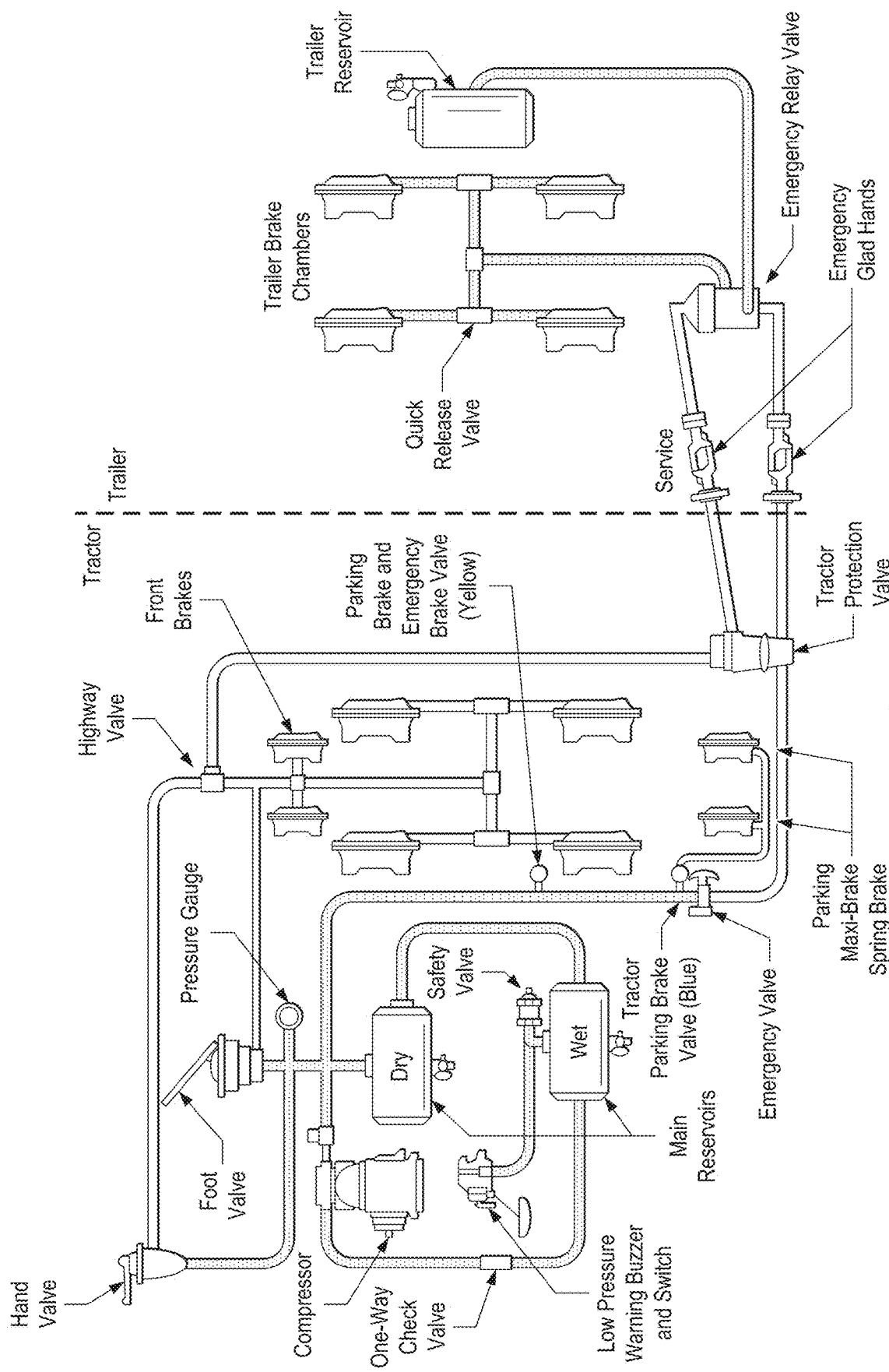
FIG. 2 provides a diagram of an exemplary brake system, in accordance with some embodiments.

In some embodiments, a typical air brake system may include an air compressor used to pump air into one or more storage tanks (e.g., reservoirs), an air compressor governor that controls when the air compressor will pump air into the air storage tanks, air storage tanks used to hold compressed air, air tank drains, an alcohol evaporator, a safety valve (e.g., as part of an air storage tank), a brake pedal used to engage service brakes, foundation brakes (e.g., used at each wheel and which may include S-cam drum brakes, disc brakes, wedge brakes, etc.), pressure gauges, spring brakes, parking brake controls, an antilock braking system (ABS), a dual air brake system, a one-way check valve, and/or other additional components. For purposes of illustration, FIG. 2 provides a diagram of an exemplary brake system 250, including at least some of the components described above.

In some examples, loss of air pressure (e.g., in the emergency air line) can cause the emergency brakes to engage and stop a vehicle and/or trailer. Such a pressure loss could be caused by a trailer breaking loose (e.g., from a towing vehicle), by a hose, metal tubing, or other part which breaks, causing an air leak. While the emergency brake system provides a way to immobilize a vehicle, the emergency brake system is really only used during an emergency or as a result of a system component failure or leak. However, there may be other circumstances in which it would be desirable to immobilize a heavy truck or tractor unit, as well as any attached trailer.

Embodiments disclosed herein provide systems and methods for on-demand immobilization of a heavy truck or tractor unit and/or any attached trailer. For example, some embodiments of the present disclosure provide for actuation of a trailer wheel-lock mechanism integrated with a supplemental electric drive (e.g., the electrically-powered drive axle). Some embodiments may employ a controlled lock-off and release of pressure in air brakes of a trailer and/or an engageable locking flange within a differential or other power transfer unit of the supplemental electric drivetrain. In some embodiments, the trailer wheel-lock mechanism or pressure release is remotely actuated via a communication interface and may be employed for anti-theft purposes.

Figure 3:
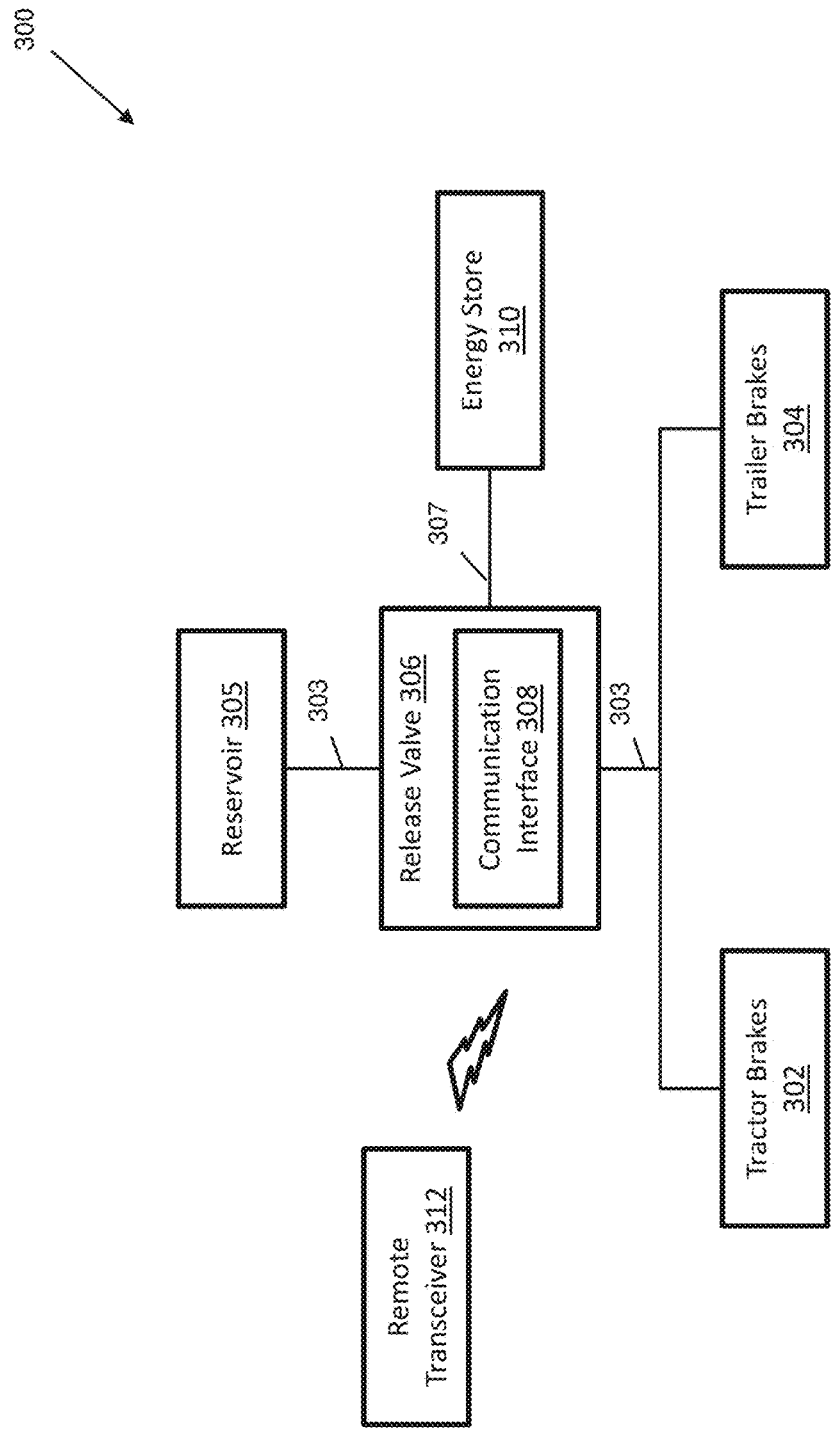
FIG. 3 illustrates a schematic of a system for remotely immobilizing a tractor-trailer vehicle, in accordance with some embodiments.

FIG. 3 illustrates a schematic of a system 300 for remotely immobilizing a tractor-trailer vehicle. In some embodiments, the system 300 may include one or more brake subsystems such as tractor brakes 302 and trailer brakes 304, which may each include an air brake system. As such, the tractor brakes 302 may be configured to actuate air brakes on a tractor unit (e.g., such as the tractor unit 165, 210), and the trailer brakes 304 may be configured to actuate air brakes on a trailer (e.g., such as the trailer 170). In some examples, the air brakes on the tractor unit and/or the trailer may be actuated when air pressure in an air line 303 (e.g., the emergency air line) falls below a first specified value or goes above a second specified value. For instance, as merely one example, if the air pressure in the air line 303 falls below about 50 psi, or goes above about 125 psi, then the air brakes may be actuated. In various embodiments, pressurized air is provided to the air line 303 from an air storage tank or reservoir 305.

The system may further include a release valve 306 fluidly coupled to the air line 303 (e.g., the emergency air line), a communication interface 308 coupled to or integrated with the release valve 306, and an energy store 310 that supplies power to the release valve 306 and/or the communication interface 308 via an electrical connection 307. In some embodiments, the energy store 310 includes the battery array 140, discussed above. In various examples, the communication interface 308 may include any of a plurality of communication interfaces configured to provide any of a plurality of connections such as a 3G cellular connection, a universal mobile telecommunications system (UMTS) connection, a high-speed packet access (HSPA) connection, a 4G/LTE connection, an RF connection, a Wi-Fi connection, a Bluetooth connection, another wireless communication interface, combinations thereof, or other appropriate connection now existing or hereafter developed. In some embodiments, the communication interface 308 may be part of the control system 150 and/or the AHED unit, discussed above. While a single air line, reservoir, and release valve are shown in the present example, it will be understood that in some cases additional reservoirs, air lines, and/or release valves may be used to accommodate various design requirements.

In some embodiments, the system 300 may also include a remote transceiver 312 configured to communicate with, and provide commands to, the release valve 306. In various embodiments, the remote transceiver 312 may include any type of computing device (e.g., similar to the user devices 230) such as a laptop, a desktop, a mobile device, or other appropriate computing device operated by any type of user (e.g., individual, driver, fleet manager, or other type of user). Thus, in some embodiments, the remote transceiver 312 may be configured to provide any of a plurality of connections such as a 3G cellular connection, a universal mobile telecommunications system (UMTS) connection, a high-speed packet access (HSPA) connection, a 4G/LTE connection, an RF connection, a Wi-Fi connection, a Bluetooth connection, another wireless communication interface, combinations thereof, or other appropriate connection now existing or hereafter developed. Further, in some cases, the remote transceiver 312 may be implemented as part of a network-connected server, database, or other network-connected service platform, such as the remote server 202, discussed above.

Whether implemented within a particular type of computing device or as part of a network-connected service platform, the remote transceiver 312 may be configured to communicate with, and provide commands to, the release valve 306 through a network (e.g., such as the network 204, discussed above). For example, in some embodiments, a user may provide commands through the remote transceiver 312 (e.g., using a particular user device) to actuate the release valve 306 and thereby position the release valve 306 in one of a first position and a second position (e.g., first and second operating positions). In some embodiments, when the release valve 306 is in the first position, the release valve 306 maintains the air pressure in the air line 303 (e.g., such as the emergency air line). In some cases, when the release valve 306 is positioned in the second position, the air pressure in the air line 303 is reduced to a value below a specified value, and the one or more brake subsystems (e.g., the tractor brakes 302 and/or the trailer brakes 304) actuate their respective air brakes to immobilize the tractor-trailer vehicle. Thus, the system 300 may provide for the controlled lock-off and release of pressure in air brakes of a tractor unit and/or trailer.

While the above example describes actuation of the air brakes by releasing (reducing) air pressure in the air line 303 using the release valve 306, the system 300 may alternatively be configured to actuate the air brakes by increasing the air pressure above a specified value. For example, in some embodiments, the communication interface 308 may be coupled to other components of the air brake system (e.g., such as the air brake system 250). Thus, in some cases, commands may be provided to the communication interface 308, using the remote transceiver 312, to control and/or direct the other components of the air brake system (e.g., such as the air compressor and governor) to build up pressure in the air line 303 and/or reservoir 305 above a specified value to actuate the air brakes on the tractor unit and/or the trailer.

Figure 4:
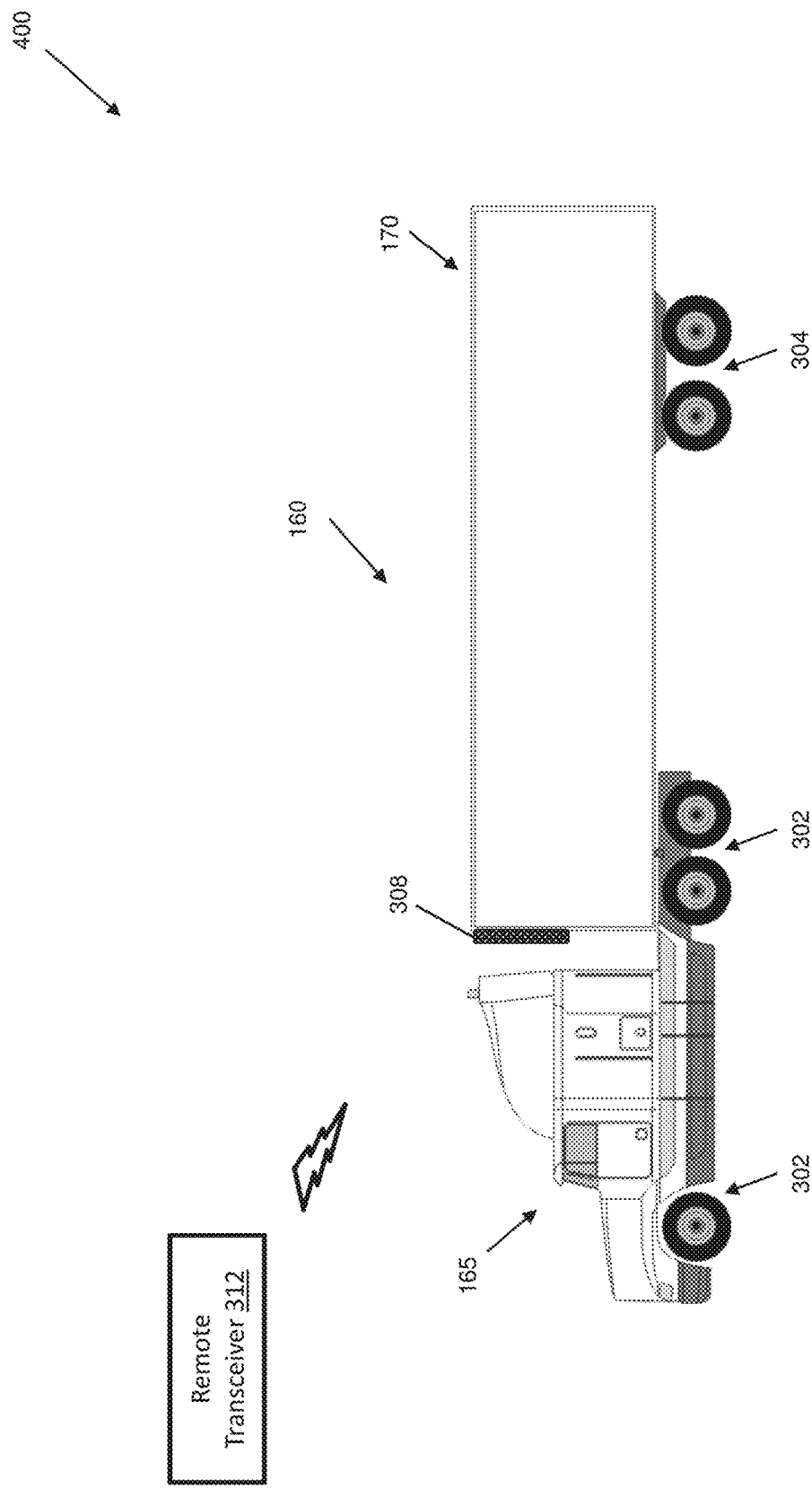
FIG. 4 illustrates a schematic of an alternative system for immobilizing a vehicle, in accordance with some embodiments.

FIG. 4 illustrates a schematic of an alternative system 400 for remotely immobilizing a tractor-trailer vehicle. As previously discussed, a tractor-trailer vehicle 160 may include a tractor unit 165 and a trailer 170. Some embodiments of the tractor-trailer vehicle 160 described above also included the hybrid suspension system 100. However, it is noted that the systems 300, 400 for immobilizing the tractor-trailer vehicle 160 need not include the hybrid suspension system 100, or any other type of hybrid vehicle component or feature.

As shown in FIG. 4, the tractor-trailer vehicle 160 may include the tractor brakes 302 on the tractor unit 165 and the trailer brakes 304 on the trailer 170. In various embodiments, each of the tractor brakes 302 and the trailer brakes 304 may be coupled to one or more air lines having one or more release valves (e.g., such as the release valve 306) fluidly coupled to the one or more air lines that may be remotely actuated, as described above, to apply the tractor brakes 302 and/or the trailer brakes 304 and thus immobilize the tractor-trailer vehicle 160. The system 400 also illustrates the communication interface 308, which as previously noted may be coupled to or integrated with the release valve(s) 306 to provide the remote actuation of the release valve(s) 306. As discussed above, the communication interface 308 may be integrated with the release valve(s) 306, may be part of the control system 150, and/or may be part of the AHED unit. Alternatively, the communication interface 308 may be attached to a portion of the trailer 170 (and/or to a portion of the tractor unit 165), while remaining coupled to release valve(s) 306 that are fluidly coupled to air lines on the tractor unit or trailer. Thus, in some cases, the systems and methods disclosed herein may be used to separately immobilize each of the tractor unit and/or trailer, regardless of whether the trailer is attached to the tractor unit or not. In some embodiments, an energy store configured to supply power to the release valve(s) 306 and/or the communication interface 308 may also be attached to the tractor unit 165 and/or the trailer 170.

The system 400 also includes the remote transceiver 312. The remote transceiver 312, as discussed above, is configured to communicate with, and provide commands to, the communication interface 308. In some embodiments, the communication interface 308 in turn provides commands to the release valve(s) 306 to provide for the controlled lock-off and release of air brake pressure, as previously discussed. Additionally, in embodiments including an electric axle (e.g., the hybrid suspension system 100), the communication interface 308 may be coupled to or integrated with the differential 115 or other part of the electric axle. As such, in some examples, the remote transceiver 312 and the communication interface 308 may further be used to provide commands to remotely actuate a wheel-lock mechanism (e.g., such as a locking flange) within the differential 115 of the electrically powered drive axle to immobilize the vehicle. In some embodiments an energy store (e.g., such as the energy store 310) may be configured to supply power to the wheel-lock mechanism and/or the communication interface 308. In some cases, the locking flange may be configured to lock one or more gears of the differential of the electrically powered drive axle. Generally, the communication interface 308 may be used to remotely actuate such a locking flange within the differential or other power transfer unit of the electrically powered drive axle.

It will be understood that elements shown and described with respect to FIGS. 3 and 4 may be incorporated with one or more of the elements shown and described with respect to FIGS. 1A, 1B, 1C, 10, 1E, 1F, and 2. In addition, while some examples of systems and methods for remotely immobilizing a tractor-trailer vehicle have been provided, those skilled in the art in possession of the present disclosure will recognize other systems and/or methods of remotely immobilizing a tractor-trailer vehicle, while remaining within the scope of the present disclosure.

For example, the tractor unit, the trailer, or the tractor-trailer vehicle may be immobilized in response to a safety-related issue. In some embodiments, systems described herein (e.g., the systems 200, 220) may provide for monitoring and reporting (e.g. to a user operating a user device 230 and/or to the remote server 202) of a variety of safety or other vehicle issues such as aggressive braking, excessive shock, excessive idling, APU power low, overheating, unit damage, battery or device failure, speeding, low tire pressure, excessively worn brake pads, or any other type of safety or vehicle issue. In some cases, and in response to receiving a report of such a safety or vehicle issue, the remote server 202 may automatically send a command to immobilize the tractor-trailer vehicle (e.g., by controlling pressure in an air line or engaging a locking flange, as described above). Alternatively, in some examples, a user operating the user device 230 (e.g., a fleet manager or operator) may send the command to immobilize the tractor-trailer vehicle in response to receiving the report of the safety or vehicle issue.

As another example, 'Operation Hours' for a given trailer and/or tractor unit may be defined and stored (e.g., in the database 224), and the remote server 202 may automatically send a command to immobilize the tractor-trailer vehicle during times of the day or night outside of the designated 'Operation Hours'. In general, any of a plurality of policies, such as 'Operation Hours', may be defined (e.g., by an operator or fleet manager) and stored (e.g., in the database 224) such that the trailer and/or tractor unit are immobilized when a policy is satisfied, thus providing policy-based immobilization. Various other types of policies may also be defined, without departing from the scope of the present disclosure. In some cases, the remote server 202 or a user operating the user device 230 may also remotely immobilize the tractor-trailer vehicle based on poor driver behaviors (e.g., poor driving patterns), real-time traffic data, weather information, road conditions and/or closures, and/or other factors. As a further example, the remote server 202 or the user operating the user device 230 may remotely immobilize the tractor-trailer vehicle while the tractor-trailer vehicle is traveling over a roadway (e.g., to prevent a theft in progress, to prevent further reckless driving, etc.). In some embodiments, if the command to immobilize the tractor-trailer vehicle is received while the vehicle is in motion, the system may be configured to slowly apply the air brakes (e.g., by sequentially applying the air brakes at one or more wheels or by carefully regulating the release of air pressure in the air line) to provide for a controlled slow-down and stop of the tractor-trailer vehicle.

Generally, in various embodiments, the systems described herein may be used to immobilize the tractor unit and/or the trailer based on various types of telematics data relating to an individual vehicle or a fleet of vehicles, such as vehicle location, vehicle diagnostics, vehicle activity, driver performance, maintenance scheduling, or other types of telematics data. Other examples of telematics data that may be used has been described above. However, the examples provided herein are not meant to be limiting in any way, and it will be understood that any type of telematics data, or other factors as described above, may be used to immobilize the tractor unit and/or trailer, without departing from the scope of the present disclosure.

Thus, the embodiments disclosed herein provide for on-demand immobilization of a heavy truck or tractor unit and/or any attached trailer by supplying commands (e.g., from a remote transceiver) to a communication interface on the tractor-trailer vehicle to release air pressure from a brake line to actuate the air brakes and immobilize the tractor-trailer vehicle or to actuate a locking flange within a differential of the electrically powered drive axle to immobilize the vehicle. To be sure, in some examples, embodiments disclosed herein may provide for actuation of a locking mechanism within another portion of a power transfer unit of the supplemental electric drivetrain (e.g., the electric axle). Various embodiments disclosed herein further provide for vehicle immobilization based on safety-related issues, defined policies, any of a plurality of telematics data, or other factors as described above. Moreover, the embodiments disclosed herein may be used for anti-theft purposes, or for any other situation when a fleet manager or operator wants to immobilize one or more heavy trucks, tractor units, or trailers.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A system for remotely immobilizing a vehicle, the system comprising:
   a first brake subsystem configured to actuate a plurality of air brakes coupled to axles of the vehicle when an air pressure in a first air line is below a specified value;
   a release valve fluidly connected to the first air line, wherein the release valve has at least a first operating position in which the air pressure in the first line is maintained, and a second operating position in which the air pressure in the first air line is released to reduce the air pressure to a value below the specified value and actuate the plurality of air brakes to immobilize the vehicle; and
   a communication interface coupled to the release valve, wherein the communication interface is configured to receive, based on designated operation hours for the vehicle, commands from a remote transceiver to position the release valve into one of the first and second operating positions.

2. The system of claim 1, wherein the vehicle includes a tractor-trailer vehicle; and
   wherein the first brake subsystem includes one of a tractor brake system and a trailer brake system.

3. The system of claim 1, wherein the vehicle includes a tractor-trailer vehicle; and
wherein the communication interface is attached to a tractor unit of the tractor-trailer vehicle or to a trailer of the tractor-trailer vehicle.

4. The system of claim 1, further comprising:
an energy store coupled to the release valve and the communication interface to provide electrical power to both.

5. The system of claim 1, wherein the remote transceiver is implemented as part of a user device or a network-connected service platform.

6. The system of claim 5, wherein the release valve is configured to move to the second operating position in response to telematics data related to the vehicle that is received by the communication interface from the remote transceiver.

7. The system of claim 1, wherein the vehicle includes a towed vehicle for use in combination with a towing vehicle, the towed vehicle having an electrically powered drive axle configured to supply supplemental torque to one or more wheels of the towed vehicle to supplement a primary motive force applied through a separate drivetrain powered by a fuel-fed engine of the towing vehicle.

8. The system of claim 1, wherein the vehicle includes a tractor-trailer vehicle, wherein the plurality of air brakes include:
a first set of air brakes coupled to axles of a tractor unit of the tractor-trailer vehicle; and
a second set of air brakes coupled to axles of a trailer of the tractor-trailer vehicle,
wherein, when the release valve is positioned in the second operating position, first set of air brakes, the second set of air brakes, or both the first and second sets of air brakes are actuated.

9. The system of claim 1, further comprising:
an air compressor to supply pressurized air; and
one or more reservoirs to store the compressed air and to supply the pressurized air to at least the first air line and a second air line.

10. The system of claim 9, further comprising:
a second brake subsystem configured to actuate the plurality of air brakes by supplying the pressurized air to the plurality of air brakes via the second air line when an operator of the vehicle depresses a brake pedal.

11. The system of claim 10, wherein the first brake subsystem includes an emergency brake subsystem, and wherein the second brake subsystem includes a service brake subsystem.

12. A system for immobilizing a towed vehicle, the system comprising:
a towed vehicle for use in combination with a towing vehicle, the towed vehicle having an electrically powered drive axle configured to supply supplemental torque to one or more wheels of the towed vehicle to supplement a primary motive force applied through a separate drivetrain powered by a fuel-fed engine of the towing vehicle;
an energy store configured to supply the electrically powered drive axle with electrical power in a first mode of operation and further configured to receive energy recovered using the electrically powered drive axle in a second mode of operation; and
a communication interface coupled to the electrically powered drive axle, wherein the communication interface is configured to receive, based on designated operation hours for the vehicle, commands from a remote transceiver to actuate a wheel-lock mechanism within the electrically powered drive axle,
wherein the actuation of the wheel-lock mechanism includes actuation of a locking flange within a differential of the electrically powered drive axle to immobilize the towed vehicle.

13. The system of claim 12, wherein the energy store is configured to supply electrical power to the wheel-lock mechanism and the communication interface.

14. The system of claim 12, wherein the locking flange is configured to lock one or more gears of the differential of the electrically powered drive axle.

15. The system of claim 12, wherein the remote transceiver is implemented as part of a user device or a network-connected service platform; and
wherein the wheel-lock mechanism is configured to actuate in response to telematics data related to the vehicle that is received by the communication interface from the remote transceiver.

16. The system of claim 15, wherein the telematics data includes one or more of:
vehicle location, vehicle diagnostics, vehicle activity, and driver performance.

17. A system comprising:
a remote device coupled to a network, the remote device including a transceiver; and
a vehicle including:
a communication interface coupled to the network, the communication interface configured to provide telematics data to, and receive commands from, the transceiver; and
an energy store on the vehicle, the energy store configured to supply electrical power to the communication interface,
wherein at least one of the commands received from the transceiver is configured to immobilize the vehicle based on designated operation hours for the vehicle.

18. The system of claim 17, wherein the at least one command received from the transceiver is configured to release air pressure in an air line of the vehicle to actuate a plurality of air brakes on the vehicle.

19. The system of claim 17, wherein the at least one command received from the transceiver is configured to actuate a wheel-lock mechanism within an electrically powered drive axle on the vehicle.

20. The system of claim 17, wherein the telematics data includes one or more of:
vehicle location, vehicle diagnostics, vehicle activity, and driver performance.

* * * * *